United States Patent
Ohsumi et al.

[11] Patent Number: 5,863,479
[45] Date of Patent: *Jan. 26, 1999

[54] PRODUCTION METHOD FOR A COMPOSITE MOLDED ARTICLE

[75] Inventors: Hisayoshi Ohsumi; Takeshi Matsumoto, both of Hamamatsu; Shinji Kato, Toyoake; Mitsuo Ishizuka; Shoichi Kaneko, both of Hamamatsu, all of Japan

[73] Assignee: Yamaha Corporation, Shizuoka-ken, Japan

[ * ] Notice: The term of this patent shall not extend beyond the expiration date of Pat. No. 5,338,592.

[21] Appl. No.: 974,445

[22] Filed: Nov. 20, 1997

Related U.S. Application Data

[63] Continuation of Ser. No. 239,735, May 9, 1994, abandoned, which is a continuation-in-part of Ser. No. 941,411, Sep. 8, 1992, Pat. No. 5,338,592.

[30] Foreign Application Priority Data

Sep. 6, 1991 [JP] Japan .................................. 3-227505

[51] Int. Cl.$^6$ ............................. B29C 45/13; B29C 45/14
[52] U.S. Cl. ......................... 264/162; 264/245; 264/247; 264/255; 264/259; 156/153; 156/245; 156/242
[58] Field of Search ..................................... 264/245, 246, 264/247, 250, 255, 259, 162; 156/242, 245, 314, 324.4, 307.3, 307.4, 308.6, 153

[56] References Cited

U.S. PATENT DOCUMENTS

| 2,804,418 | 8/1957 | King . |
| 4,002,790 | 1/1977 | Trewiler .................................. 428/212 |
| 4,089,922 | 5/1978 | Saito et al. ............................... 264/245 |
| 4,141,944 | 2/1979 | Anstadt et al. .......................... 264/129 |
| 4,267,229 | 5/1981 | Knight et al. ............................ 264/245 |
| 4,293,603 | 10/1981 | Hayman-Chaffey et al. .......... 264/129 |
| 4,316,869 | 2/1982 | Van Gasse ............................... 264/255 |
| 4,414,317 | 11/1983 | Culp et al. ............................... 264/247 |
| 4,416,716 | 11/1983 | Ichikawa et al. ........................ 264/255 |
| 4,902,594 | 2/1990 | Platzer ..................................... 156/230 |
| 5,480,698 | 1/1996 | Hayman-Chaffey ..................... 264/129 |

FOREIGN PATENT DOCUMENTS 3-30922 2/1991 Japan .

*Primary Examiner*—Angela Ortiz
*Attorney, Agent, or Firm*—Ostrolenk, Faber, Gerb & Soffen, LLP

[57] ABSTRACT

The front surface of a wooden overlay sheet having a wood material on the front surface is subjected to a color treatment with a colorant. A resin-based primer is then applied to the colored front surface and a transparent resin layer is then formed on the resin-based primer.

31 Claims, 4 Drawing Sheets

PRODUCTION METHOD FOR A COMPOSITE MOLDED ARTICLE

CROSS-REFERENCE RELATED APPLICATION

This is a Continuation of application Ser. No. 08/239,735 filed on May 9, 1994, now abandoned; which is a CIP of Ser. No. 07/941,411 filed on Sep. 8, 1992, now U.S. Pat. No. 5,338,592, entitled "Production Method for Composite Molded Article", the entire disclosure of which is hereby incorporated by reference.

BACKGROUND OF THE INVENTION

The present invention relates to a production method of a composite molded article consisting of a wooden overlay sheet having a wooden material at the front surface thereof and a synthetic resin core material.

PRIOR ART

Hitherto, composite molded articles consisting of a wooden overlay sheet having a wooden material at the front surface thereof and a synthetic resin core material have been employed as, for instance, high grade furniture material and interior material for use in luxury vehicles.

Such a composite molded article, as is for instance shown in FIG. 1, having a structure wherein a synthetic resin core material 2 is injection-molded on the rear side of a wooden overlay sheet 1, and a transparent synthetic resin layer 3 is injection-molded on the front surface of wooden overlay sheet 1 so as to form a unit, has been proposed (Japanese Patent Application First Publication No. 3-30922).

With such a composite molded article 4, a realistic woody texture is obtained because a transparent resin layer 3 is formed on the front surface of wooden overlay sheet 1. Furthermore, painting of the surface is not required, thus facilitating production, enhancing productivity, and reducing production costs.

Furthermore, such a composite molded article 4 can be produced in the following way when using, for instance, a two layer injection-molding device provided with two injection units. First, wooden overlay sheet 1 is placed inside the metal mold of an injection-molding device; the mold is closed and molding is performed; then, on the rear side of wooden overlay sheet 1, a synthetic resin is injected by the injection unit of one side and synthetic resin core material 2 is molded. Next, a transparent synthetic resin is injected on the front surface of wooden overlay sheet 1 by means of the injection unit of the other side, transparent resin layer 3 is molded, and the composite molded article is produced.

It is efficient to subject the front surface of wooden overlay sheet 1 to coloring and painting prior to molding in order to enhance the outward appearance of composite molded article 4 as a product. For coloring and painting, conventional synthetic resin colorants for use with wooden materials, such as urethane-based colorant to which a color pigment has been added, or an acryl-based colorant, are employed.

However, when using a urethane-based colorant for coloring the wooden overlay sheet 1, after subjecting the front surface of wooden overlay sheet 1 to coloring treatment, and subsequent molding of transparent layer 3 on the front surface, the miscibility of the colorant and transparent layer 3 is inferior, and there is the danger of a peel-off of transparent layer 3 at the interface of wooden overlay sheet 1 and transparent resin layer 3. Furthermore, when employing an acryl-based colorant, the heat resistance of this colorant is limited and, therefore, the colorant flows when molding the transparent resin layer 3 by means of injection-molding, and there is the disadvantage that patterns are formed on the front surface and that the outer appearance of the product is negatively affected.

SUMMARY OF THE INVENTION

The present invention relates to a composite molded article and a production method therefor in which a wooden overlay sheet having a wooden material on the front surface thereof is subjected to a color treatment with a colorant. A resin-based primer is then applied to the colored front surface and a transparent resin layer is then formed on the resin based primer.

In accordance with the present invention, it is possible to obtain a composite molded article with an apparently realistic woody texture wherein a transparent resin layer is molded on the front surface of the wooden overlay sheet. Furthermore, it is not required to perform painting on the front surface of the composite molded article, and it is therefore possible to facilitate production, enhance productivity, and reduce production cost.

Other features and advantages of the present invention will become apparent from the following description of the invention which refers to the accompanying drawings.

DETAILED DESCRIPTION OF THE PREFERRED EMBODIMENTS

Figure 4:
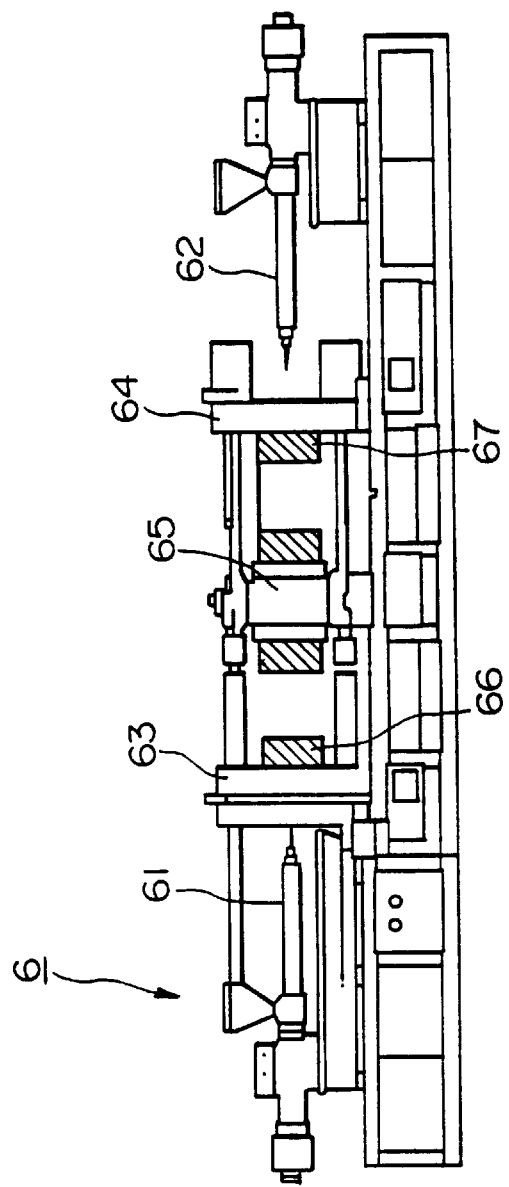
FIG. 4 is a cross sectional view showing an example of a two-layer injection molding device.
Figure 5:
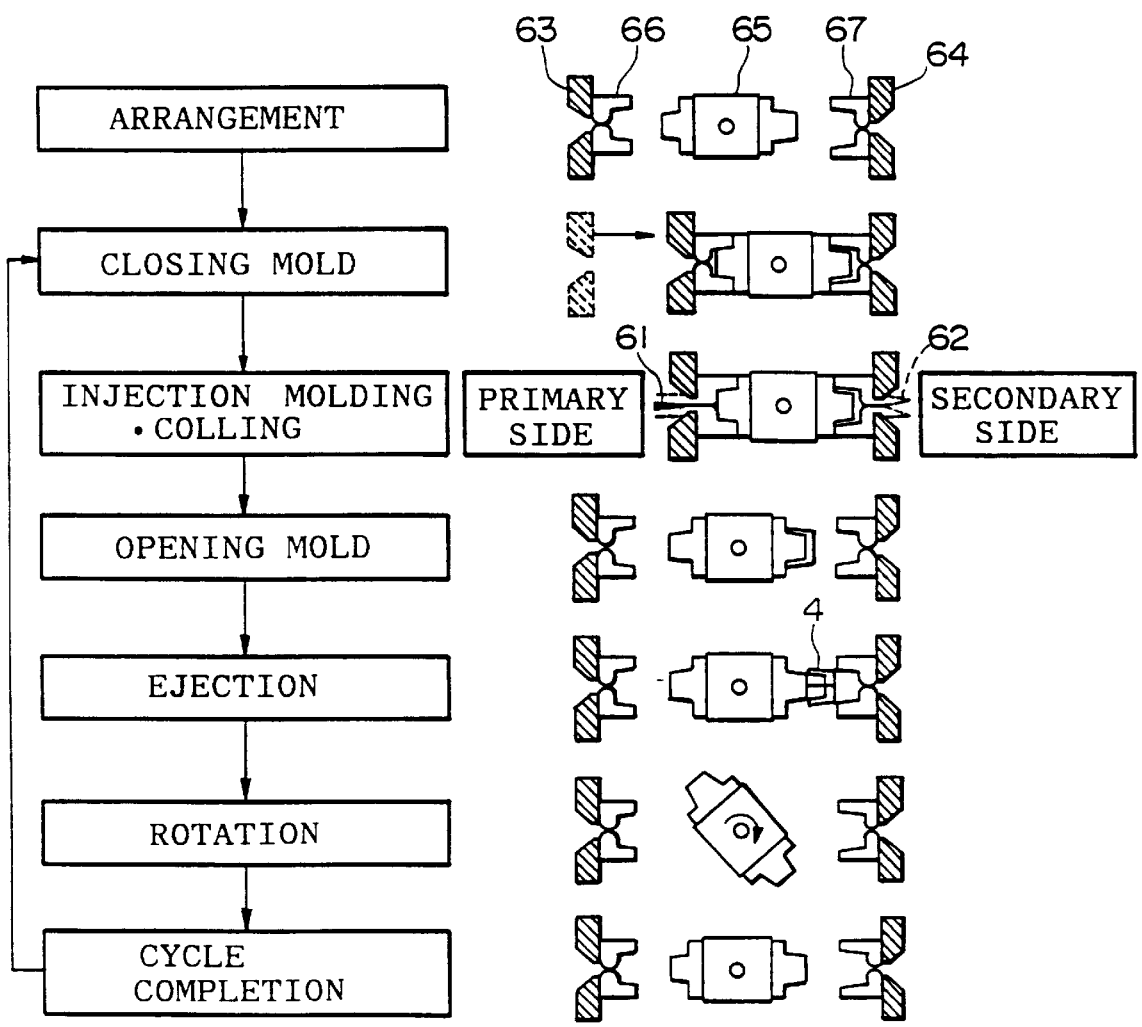
FIG. 5 is a cross sectional view showing the standard movement mode of a two-layer injection molding device.
Figure 6:
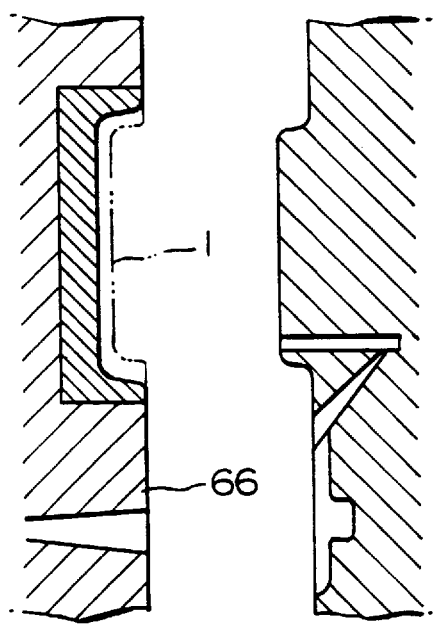
FIG. 6 is a cross sectional view of an essential portion showing the condition in which the wooden overlay sheet is positioned in the metal mold of the two-layer injection molding device.

FIG. 4 shows a two-layer injection molding device 6 which is preferably employed in the production method of composite molded article 4 of the present invention. The device is, on both sides, provided with a primary injection unit 61 and secondary injection unit 62. Furthermore, the device is provided with a rotation platen 65 which is rotatable 360° in a horizontal direction between movable platen 63 and fixed platen 64. FIG. 5 shows the standard movement mode for continuously manufacturing the composite molded article 4 employing such a device; FIG. 6 is a drawing showing the condition in which the preliminarily molded wooden overlay sheet is positioned in the metal mold of such a device.

Figure 1:
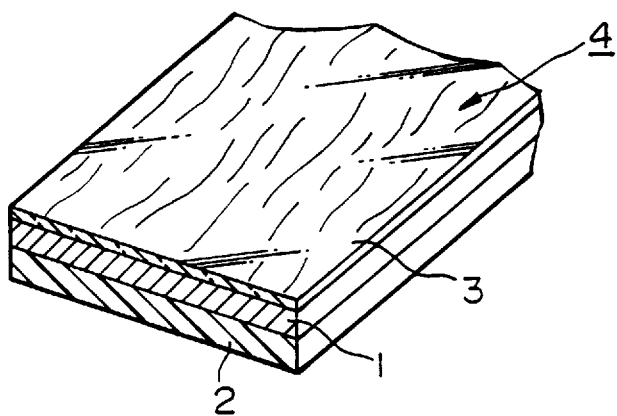
FIG. 1 is a cutaway cross sectional view showing a portion of an example of a composite molded article.

When employing the production method of the present invention and manufacturing a composite molded article, such as the one shown in FIG. 1, first the wooden overlay sheet 1 is produced.

Figure 2:
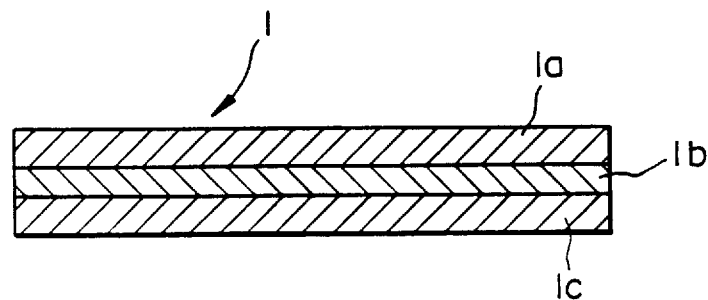
FIG. 2 is a cross sectional view showing an example of the wooden overlay sheet.

FIG. 2 shows an embodiment of wooden overlay sheet 1. Here, the product is constructed so that wooden material 1a is laminated onto the front surface of a thin metal sheet 1b, consisting of, for instance, aluminum or steel, and rear portion material 1c is laminated onto the rear side of the thin metal sheet 1b.

Wooden material 1a is formed of a wood veneer or a sliced veneer having an attractive grain pattern of a suitable thickness.

Furthermore, there is the option to provide thin metal sheet 1b to strengthen wooden material 1a; however, a structure without such a provision is also possible.

As for thin metal sheet 1b, a thickness within a range of 0.05~0.5 mm is preferably employed; if thin metal sheet 1b is too thin, reinforcement of wooden material 1a cannot be achieved, and if the thin metal sheet is too thick, the stiffness will be too great.

Furthermore, there is the option to provide rear portion material 1c in order to enhance the handling of wooden overlay sheet 1, and to improve the adhesion of wooden overlay sheet 1, which is the front surface material of composite molded article 4, and of the synthetic resin, which is used as the core material; a structure without such a provision is also possible.

For rear portion material 1c, a porous material such as a foam resin sheet or wood veneer, a non-woven fabric, or a fibrous material such as a glass fiber mat can be employed. For instance, when using a fibrous material, the weight per unit area is preferably within a range of 30–70 gm$^2$.

When producing wooden overlay sheet 1, a method is employed wherein the wooden material 1a, thin metal sheet 1b, and rear portion material 1c are laminated in order with a bonding agent therebetween and are affixed by applying heat and pressure, thus forming a unitary body.

Next, coloring treatment is performed on the front surface of the obtained wooden overlay sheet 1; that is, on the front surface of the wooden material 1a, wherein a primer-based colorant is employed. It is desirable to subject the front surface of wooden material 1a to grinding processing prior to coloring processing.

With respect to the employed primer-based colorant, it is possible to use a resin-based colorant such as a vinyl butyral-based colorant or the substance described in connection with Embodiment 4, to which a suitable color pigment is added to adjust the color; furthermore, it is possible to mix in a suitable solvent. Then, it is possible to apply the colorant on wooden material 1a by a suitable method of application such as spray painting or brush coating.

Furthermore, it is possible to fix the amount of colorant applied according to the quality of the colorant and the type of wooden material; it is desirable that the application be performed uniformly.

Figure 3:
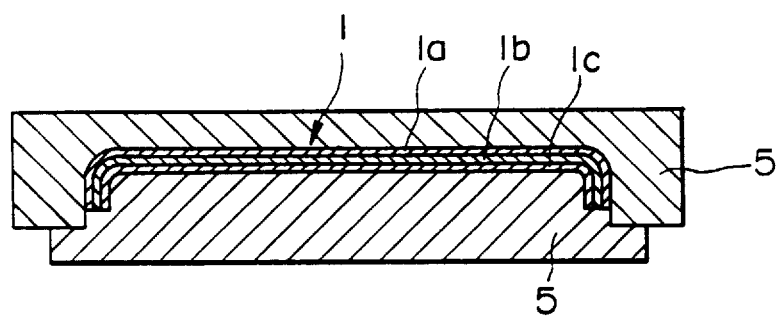
FIG. 3 is a cross sectional view showing an example of the preliminary molding process of the wooden overlay sheet.

Next, wooden overlay sheet 1, which had been subjected to coloring treatment, is cut to a predetermined shape and preliminary molded is performed. Such a preliminary molding is, as is shown in FIG. 3, performed by employing a conventional mold 5 and using a press. When performing the preliminary molding in the aforementioned way, wooden overlay sheet 1, by means of plastic deformation of the thin metal sheet thereof, maintains its form after performance of preliminary molding and does not return to the original sheet shape.

When employing a structure in which wooden overlay sheet 1 does not comprise thin metal sheet 1b, it is possible to eliminate the preliminary molding processing.

Next, synthetic resin core material 2 and transparent resin layer 3 are molded by means of two-layer injection molding.

For molding synthetic resin core material 2, a resin such as ABS resin, polycarbonate resin, or modified polyphenylene oxide (PPO) resin can be employed; furthermore, for molding of transparent resin layer 3, a resin such as AS resin, acrylic resin, or ABS resin can be employed.

With regard to the order of steps, first, preliminarily molded wooden overlay sheet 1 is, as is shown in FIG. 6, positioned within primary side metal mold 66 of the injection molding device.

Thereafter, the mold is closed, and during the continuous molding, in the first step, injection-molding is performed by primary injection unit 61 only; from the second step onwards, injection-molding is performed simultaneously by primary injection unit 61 and secondary injection unit 62. At this point, the synthetic resin, which forms the core material at the rear side of wooden overlay sheet 1 is injected at the primary side metal mold 66, and the core material is thereby molded.

On the other side, at secondary side metal 67, the transparent synthetic resin is injection molded on the front surface of wooden overlay sheet 1, and transparent resin layer 3 is molded.

Next, the mold is opened and the product of the secondary side only is ejected and removed from metal mold 67; rotation platen 65 is rotated 180° so as to complete a cycle. By repeating the aforementioned process, it is possible to continuously manufacture composite molded article 4.

With respect to composite molded article 4, which has been molded in the aforementioned way, it is possible to achieve an apparently realistic woody texture because wooden overlay sheet 1 is in contract with transparent resin layer 3 of the front surface and is distinctly visible. Furthermore, because the front surface of wooden overlay sheet 1 is subjected to color treatment, the product appearance is excellent. Since a resin-based primer has been used, the adhesion of wooden overlay sheet 1 and transparent resin layer 3 is good; furthermore, when molding transparent resin layer 3 by means of injection-molding, there is no flow of the colorant and, therefore, a product with a superb finish can be obtained.

Furthermore, in the above production processing, the process of subjecting wooden overlay sheet 1 to color treatment can also be performed after the preliminary molding. It is also possible to perform the process of injection synthetic resin core material 2, and the process of injecting transparent resin layer 3 in a non-continuous manner, and to perform color treatment of wooden overlay sheet 1 after injection-molding synthetic resin core material 2, and then perform injection molding of transparent resin layer 3.

Furthermore, if wooden overlay sheet 1 is not subjected to preliminary molding, then wooden overlay sheet 1 is positioned within primary side metal mold 66 by means of, for instance, a vacuum holding, and it is possible to preform pressure molding when the mold is closed.

Embodiment 1

First, the following are provided: a thin aluminum sheet 1b of a thickness of 0.1 mm, which was subjected to a phosphate chromate membrane treatment, a walnut veneer 1a of a thickness of 0.2 mm, and a birch veneer 1c of a thickness of 0.2 mm.

Wooden overlay sheet 1, which is constructed in a three-layer fashion, was formed by laminating walnut veneer 1a into the front surface of thin aluminum sheet 1b, employing a cross-linking urethane dispersion bonding agent, and by laminating, in the same fashion, birch veneer 1c onto the rear surface, employing a cross-linking urethane dispersion bonding agent, thereby forming a unitary body. With regard to the bonding, the amount of bonding agent applied was set at 100 g/m$^2$, and bonding was performed at a temperature of 135° C. by applying a pressure of 10 kg/cm$^2$ for a period of 10 minutes.

The vinyl butyral-resin based colorant was then prepared. Five parts per weight of ESUREKKU-BMS (produced by Sekisui Kagaku K.K.), 50 parts per weight of methanol, and 50 parts per weight of toluene were mixed; color pigment was added and color adjustment to a predetermined color was performed.

After subjecting the front surface of the aforementioned wooden overlay sheet 1, that is, the front surface of walnut veneer 1a, to grinding processing wherein an abrasive paper with a grit number of 240 was employed, the previously prepared colorant was applied by spraying. The amount applied at this point was set at 50–100 g/m$^2$.

After subjecting the colorant to natural drying, wooden overlay sheet 1 was cut to a predetermined shape, and preliminary molding with a press was performed thereon.

Preliminarily molded wooden overlay sheet 1 was placed within metal mold 66 of a two-layer injection molding device, which is shown in FIG. 4, and the ABS resin which becomes core material 2 was injected on the rear surface of wooden overlay sheet 1 by means of primary injection unit 61. Next, rotation platen 65 was reversed, and the acrylic resin, which becomes transparent resin layer 3, was injected by means of secondary injection unit 62. The product was removed from secondary side metal mold 67, and composite molded article 4 was obtained.

Composite molded article 4, which has been obtained in the aforementioned way, is a superb product with regard to its apparently realistic woody texture. Furthermore, on the front surface of wooden overlay sheet 1, no pattern due to flow of colorant visible, and there was no separation of wooden overlay sheet 1 and transparent resin layer 3.

Embodiment 2

Wooden overlay sheet 1 was formed in the same way as in Embodiment 1; that is, a walnut veneer 1a of a thickness of 0.2 mm was laminated onto thin aluminum sheet 1b; however, with the exception that an acrylic non-woven fabric 1c with a weight per unit area of 50 g/m$^2$ was laminated onto the rear surface; composite molded article 4 was produced by proceeding in the same way as in Embodiment 1.

Embodiment 3

Wooden overlay sheet 1 was formed in the same way as in Embodiment 1; that is, a walnut veneer 1a of a thickness of 0.2 mm was laminated onto thin aluminum sheet 1b; however, a surfacing mat (glass fiber mat) 1c with a weight per unit area of 70 g/m$^2$ was laminated onto the rear surface; composite molded article 4 was produced by proceeding in the same way as in Embodiment 1.

The obtained composite molded article 4 is a superb product with regard to its apparent realistic woody texture. Furthermore, on the front surface of wooden overlay sheet 1, no pattern due to flow of the colorant was visible, and there was no separation of wooden overlay sheet 1 and transparent layer 3.

Embodiment 4

In the following, another embodiment of the present invention will be described with reference to Table 1. It should be noted that while a wooden overlay sheet is formed according to the following description, the present process is suitable for use in a variety of wooden material. In this embodiment, a "primer layer" is defined as a layer inserted between a base layer to which resin poorly adheres, and a resin layer provided over the base layer for protecting it. Consequently, the primer layer attaches the base layer to the resin layer for protecting the base layer. The primer layer may be formed with a single constituent layer or plural constituent layers.

When employing the production method of the present invention and manufacturing a composite molded article, such as the one shown in FIG. 1, first the wooden overlay sheet 1 is produced as described above.

Next, coloring treatment is performed on the front surface of the obtained wooden overlay sheet 1; that is, on the front surface of wooden material 1a. For a colorant, exemplary substances will be described through Examples 1–8 hereunder below. It is desirable to subject the front surface of wooden material 1a to sanding processing prior to coloring processing.

With respect to the employed primer-based colorant, it is possible to use a resin-based colorant such as a urethane resin and epoxy resin colorant, to which a suitable color pigment is added to adjust the color; furthermore, it is possible to mix in a suitable solvent. Then, it is possible to apply the colorant on wooden material 1a by a suitable method of application such as spray painting or brush coating.

Furthermore, it is possible to fix the amount of colorant applied according to the quality of the colorant and the type of wooden material; it is desirable that the application be performed uniformly.

Next, wooden overlay sheet 1, which had been subjected to coloring treatment, is cut to a predetermined shape and preliminary molding is performed as described above.

When employing a structure in which wooden overlay sheet 1 does not comprise thin metal sheet 1b, it is possible to eliminate the preliminary molding processing.

Next, synthetic resin core material 2 and transparent resin layer 3 are molded by means of two-layer injection molding. As synthetic resin core material 2, a resin such as ABS resin, polycarbonate resin, modified polyphenylene oxide (PPO) resin, or polyphenylene sulphide (PPS) can be employed. As transparent resin layer 3, a resin such as acrylonitrile styrene (AS) resin; acrylic resin; polymer alloy of acrylic resin and acrylonitrile-butadiene- styrene resin; polymer alloy of acrylic resin and acrylonitrilestyrene resin; polymer alloy of acrylonitrile-styrene resin and acrylonitrile-butadiene- styrene resin; polycarbonate resin; and polystyrene resin can be employed.

With regard to the order of steps, first, preliminarily molded wooden overlay sheet 1 is, as is shown in FIG. 6, positioned within primary side metal mold 66 of the injection molding device.

Thereafter, the mold is closed, and during the continuous molding, in the first step, injection-molding is performed by primary injection unit 61 only; from the second step onwards, injection-molding is performed simultaneously by primary injection unit 61 and secondary injection unit 62. At this point, the synthetic resin, which forms the core material at the rear side of wooden overlay sheet 1 is injected at the primary side metal mold 66, and the core material is thereby molded.

On the other side, at secondary side metal mold 67, the transparent synthetic resin is injection molded on the front surface of wooden overlay sheet 1, and transparent resin layer 3 is molded. From the perspective of manufacturing a wooden overlay sheet, a core layer can be first molded, and a transparent resin layer can thereafter be formed, or vice versa.

Next, the mold is opened and the product of the secondary side only is ejected and removed from metal mold 67; rotation platen 65 is rotated 180° so as to complete a cycle. By repeating the aforementioned process, it is possible to continuously manufacture composite molded article 4.

With respect to composite molded article 4, which has been molded in the aforementioned way, it is possible to achieve an apparently realistic woody texture because wooden overlay sheet 1 is in contact with transparent resin layer 3 of the front surface and is distinctly visible. Furthermore, because the front surface of wooden overlay sheet 1 is subjected to color treatment, the product appearance is excellent. Since a resin-based primer has been used, the adhesion of wooden overlay sheet 1 and transparent resin layer 3 is improved; furthermore, when molding transparent resin layer 3 by means of injection-molding, there is no flow of the colorant and therefore a product with a superb finish can be obtained.

Furthermore, in the above production processing, the process of subjecting wooden overlay sheet 1 to color treatment can also be performed after the preliminary molding. It is also possible to perform the process of injecting synthetic resin core material 2, and the process of injecting transparent resin layer 3 in a non-continuous manner, and to perform color treatment of wooden overlay sheet 1 after injection molding synthetic resin core material 2, and then perform injection molding of transparent resin layer 3.

Furthermore, if wooden overlay sheet 1 is not subjected to preliminary molding, then wooden overlay sheet 1 is positioned within primary side metal mold 66 by means of, for instance, a vacuum holding, and it is possible to perform pressure molding when the mold is closed.

Examples of resins employed in this embodiment are shown in Table 1. In addition, concrete examples of primer layers and transparent resin layers, as well as an illustrative production method for composite molded articles are explained in the following Examples 1 to 8.

EXAMPLE 1

A wooden material 1a in the upper portion of a wooden overlay sheet 1 produced by the above method is colored by using a colorant comprising a urethane resin. A primer layer is then provided thereover. According to Example 1, the primer layer consists of two sub-layers of primers. Initially, a first primer sub-layer comprising transparent or translucent urethane resin is provided. A second primer sub-layer comprising epoxy resin is then provided over the first primer sub-layer. Each primer sub-layer is provided at room temperature using a method such as an air spray method, an airless spray method, an air misting electrostatic method, a bell type electrostatic method, a flow coater method, a roll coater method, a roller curtain flow coater method, a spin coater method, and a dip coater method.

According to the above, the first primer sub-layer prevents moisture and bubbles, which arise from the colorant provided thereunder, from penetrating through the transparent resin layer which is provided over the primer layer. Moreover, the first primer sub-layer suppresses bleeding of the colorant from bleeding. The second primer sub-layer adheres to a following transparent resin layer. After the primer layer is provided, the wooden overlay sheet 1 is molded into the desired shape, after which, a transparent resin layer is injection-molded onto wooden overlay sheet 1 using the injection-molding device shown in FIG. 4. According to Example 1, one of the following resins is injection-molded as a transparent layer at approximately 240° C., under a pressure of 40–150 MPa:

(1) acrylonitrile styrene (AS) resin;

(2) acrylic resin;

(3) polymer alloy of acrylic resin and acrylonitrilebutadiene-styrene resin (ABS resin); and (4) polymer alloy of acrylic resin and acrylonitrilestyrene resin.

In general, carbonization of a wooden material starts at approximately 230° C. However, according to the present invention, even if the injection is carried out at approximately 240° C., the wooden material will not be carbonized since a transparent resin layer is provided through use of a primer layer.

Polycarbonate resin (melting point: 250° C.) may be used to form a transparent resin layer instead of resin selected from the above-mentioned group of (1)–(4) by means of a low pressure compression injection-molding method at a temperature of 250°~260° C., while applying a pressure of 20–80 MPa. The aforementioned polycarbonate resin has an extremely high viscosity below its melting point. Therefore, an extremely high injection pressure is required for injection-molding the polycarbonate resin below its melting point due to this extremely high viscosity. In contrast, according to the present invention, injection can be carried out at a low pressure when the processing temperature exceeds the melting point of the polycarbonate resin. In addition, a translucent polycarbonate layer may be employed as the transparent resin layer in order to reduce the internal stress generated in the transparent resin layer.

Modification 1 of Example 1

According to Example 1, a second primer sub-layer comprising epoxy resin is formed. It is also possible to form a second primer sub-layer comprising polyurethane, instead of the epoxy resin, which is obtained by reacting isocyanate with the hydroxyl (OH) groups of an epoxy resin (epoxy polyol). The polyurethane (urethane resin) may be a one-component type or two-component type resin.

The incorporation of the isocyanate, employed in order to obtain the polyurethane, in the second primer sub-layer has the following effects:

(a) The second primer sub-layer improves the mechanical strength of the primer layer, and prevents the primer layer from peeling off.

(b) The second primer sub-layer allows the injection temperature of a transparent resin layer to be formed to increase up to 260°~270° C., since partial formation of cross-linkages by isocyanate present in the polyurethane enhances the heat resistance of the second primer sub-layer. As a result, the fluidity of the resin to be formed is enhanced, which in turn makes a surface of the transparent resin layer smooth, thereby improving the appearance of the product.

In addition, use of a primer layer comprising polyurethane:

(c) enables the primer layer to absorb strain and stress produced by the force applied during molding; and prevents cracking which may occur due to strain and the like since adhesion strength is improved, as a result, mechanical strength is also improved.

Modification 2 of Example 1

According to Example 1, a second primer sub-layer comprising epoxy resin is formed; however, a second primer sub-layer comprising polyurethane, instead of epoxy resin, which is obtained by reacting isocyanate with one of the following, may also be used:

(1) hydroxyl groups in a polyester resin (polyester polyol); (2) hydroxyl groups in an acrylic resin (acrylic polyol); and (3) hydroxyl groups in a polyether resin (polyether polyol).

A composite molded article 4, which has been obtained in one of the aforementioned ways, is a superb product with regard to its apparently realistic woody texture. Furthermore, on the front surface of the wooden overlay sheet 1, no bleeding pattern due to flow of the colorant was visible, and there was no separation of the wooden overlay sheet 1 and the transparent resin layer 3.

EXAMPLE 2

A wooden material 1a having large and deep vessels (e.g., Japanese oak, white ash, mahogany, etc.) in the upper portion of a wooden overlay sheet 1 is colored by using a filler colorant comprising urethane resin. According to Example 2, the filler colorant comprises a mixture of a colorant and an extender (such as talc, calcium carbonate, diatomaceous earth, and mica). The filler colorant colors the wooden material 1a as well as fills the vessels presenting on the surface of the wooden material 1a. Subsequently, the surface of the filler colorant is smoothed using sandpaper. A primer layer consisting of two sublayers of primers is then formed on the colored wooden material 1a. A first primer sub-layer consisting of a urethane resin is initially formed. A second primer sublayer comprising epoxy resin is then formed. For forming the primer sub-layers, a method such as an air spray method, an airless spray method, an air misting electrostatic method, a bell type electrostatic method, a flow coater method, a roll coater method, a roller curtain flow coater method, a spin coater method, and a dip coater method may be employed. According to this process, the smoothness of the surface can be further enhanced. The use of the filler colorant to fill the vessels produces the following effects:

(a) The filler colorant improves the appearance after a transparent resin layer is provided over the primer resin layer, with a smooth and planar surface without depressions, since the filler colorant fills the vessels; and (b) The filler colorant prevents formation of spaces between the primer layer and wood material since depressions caused by vessels are filled with the filler colorant. Otherwise, depressions remain, as primer resin tends not to penetrate into large and deep vessels, and cause expansion of remaining air in the spaces during heat-cycle test.

Next, a transparent resin layer is provided over the wooden material 1a. According to Example 2, the transparent resin layer is formed on the primer sub-layer comprising the same substances as those described in Example 1. Materials, conditions, and the like employed in order to form the transparent resin layer are the same as those described in Example 1.

EXAMPLE 3

A wooden material 1a in the upper portion of a wooden overlay sheet 1 is colored by using a colorant comprising a urethane resin. A primer layer is then provided thereover. According to Example 3, the primer layer consists of two sub-layers of primers. A first primer sub-layer comprising transparent or translucent urethane resin is initially provided over the colorant. A second primer sub-layer comprising vinylbutyral resin is then provided over the first primer sub-layer. Each primer sub-layer is formed at room temperature by using a method such as an air spray method, an airless spray method, an air misting electrostatic method, a bell type electrostatic method, a flow coater method, a roll coater method, a roller curtain flow coater method, a spin coater method, and a dip coater method.

After the primer layer is formed, the wooden overlay sheet 1 is molded into a desirable shape, and a transparent resin layer is then injection-molded at approximately 240° C., under a pressure of 40°–150 MPa on the wooden overlay sheet 1 by using the injection-molding device shown in FIG. 4. One of the following resins can be employed as the transparent resin layer:

(1) acrylonitrile styrene (AS) resin;

(2) acrylic resin; and (3) acrylonitrile-butadiene-styrene (ABS) resin.

A composite molded article 4, which has been obtained in the method of Example 3, is a superb product with regard to its apparently realistic woody texture. Furthermore, on the front surface of the wooden overlay sheet 1, no bleeding pattern due to flow of the colorant was visible, and there was no separation of the wooden overlay sheet 1 and the transparent resin layer 3.

EXAMPLE 4

A wooden material 1a having large and deep vessels (e.g. Japanese oak, white ash, mahogany, etc.) in the upper portion of a wooden overlay sheet 1 is colored by using a filler colorant comprising urethane resin. The filler colorants are the same as described in Example 2. Subsequently, the surface of the filler colorant is smoothed by using sandpaper. This process is employed so as to enhance the planarity. A primer layer consisting of two sub-layers of primers is formed over the thus-smoothed wooden overlay sheet 1. A first primer sub-layer comprising transparent or translucent urethane resin is initially provided over the colorant. A second primer sub-layer comprising vinylbutyral resin is then provided thereover. Each primer sub-layer is formed at room temperature using a method such as an air spray method, an airless spray method, an air misting electrostatic method, a bell type electrostatic method, a flow coater method, a roll coater method, a roller curtain flow coater method, a spin coater method, and a dip coater method.

Next, a transparent resin layer is provided over the primer sub-layer. Materials, conditions, and the like employed in order to form the transparent resin layer are the same as those described in Example 3.

EXAMPLE 5

A wooden material 1a in the upper portion of a wooden overlay sheet 1 is colored by a colorant comprising epoxy resin. Subsequently, a primer layer is provided thereover. According to Example 5, the primer layer consists of two sub-layers of primers. A first primer sub-layer comprising epoxy resin is initially formed over the colorant. The first primer sub-layer is provided in order to prevent moisture and bubbles, which arise from the colorant provided thereunder, from penetrating a transparent resin layer which will be provided on the primer layer. A second primer sublayer comprising epoxy resin is then formed. Each primer sub-layer is formed at room temperature using a method such as an air spray method, an airless spray method, an air misting electrostatic method, a bell type electrostatic method, a flow coater method, a roll coater method, a roller curtain flow coater method, a spin coater method, and a dip coater method.

After the primer layer is provided, the wooden overlay sheet 1 is molded into a desirable shape, and then, a transparent resin layer is injection-molded on the wooden overlay sheet 1 by using the injection-molding device shown in FIG. 4. According to Example 5, the transparent resin layer is selected from one of the following resins:

(1) acrylonitrile styrene (AS) resin;
(2) acrylic resin;
(3) polymer alloy of acrylic resin and acrylonitrilebutadiene-styrene resin (ABS resin); and
(4) polymer alloy of acrylic resin and acrylonitrilestyrene resin.

The resin is injection-molded at approximately 240° C. while applying a pressure of 40~150 MPa during the molding.

Polycarbonate resin (melting point: 250° C.) may be used to form a transparent resin layer instead of resin selected from the above-mentioned resins (1)–(4), by means of a low pressure compression injection-molding method at a temperature of 250°~260° C., under a pressure of 20~80 MPa. A translucent polycarbonate layer may be employed as the transparent resin layer in order to reduce the internal stress generated in the transparent resin layer.

A composite molded article 4, which has been obtained in the aforementioned way in Example 5, is a superb product with regard to its apparently realistic woody texture. Furthermore, on the front surface of the wooden overlay sheet 1, no pattern due to flow of the colorant was visible, and there was no separation of the wooden overlay sheet 1 and the transparent resin layer 3.

EXAMPLE 6

A wooden material 1a in the upper portion of a wooden overlay sheet 1 is colored by using a colorant comprising a urethane resin. Subsequently, the surface of the colorant is smoothed by using sandpaper. Then, a primer layer consisting of two sub-layers of primers is formed thereover. A first primer sub-layer comprising unsaturated polyester resin is initially formed over the colorant. Subsequently, the surface of the first primer sub-layer is smoothed by using sandpaper. A second primer sub-layer comprising epoxy resin is then formed. Each primer sub-layer is formed at room temperature by using a method such as an air spray method, an airless spray method, an air misting electrostatic method, a bell type electrostatic method, a flow coater method, a roll coater method, a roller curtain flow coater method, a spin coater method, and a dip coater method.

After the primer layer is provided, the wooden overlay sheet 1 is molded into a desirable shape, and a transparent resin layer is then injection-molded on the wooden overlay sheet 1 using the injection-molding device as shown in FIG. 4. According to Example 6, one of the following resins is injection-molded at approximately 240° C., under a pressure of 40~150 MPa:

(1) acrylonitrile styrene (AS) resin;
(2) acrylic resin;
(3) polymer alloy of acrylic resin and acrylonitrilebutadiene-styrene resin (ABS resin); and
(4) polymer alloy of acrylic resin and acrylonitrilestyrene resin.

Polycarbonate resin (melting point: 250° C.) may be used to form a transparent resin layer instead of resin selected from the above-mentioned resins (1)–(4), by means of a low pressure compression injection-molding method at a temperature of 250°~260° C., under a pressure of 20~80 MPa. A translucent polycarbonate layer may be employed as the transparent resin layer in order to reduce the internal stress generated in the transparent resin layer.

EXAMPLE 7

A wooden material 1a in the upper portion of a wooden overlay sheet 1 is colored by using a colorant comprising urethane resin. Next, a primer layer comprising urethane resin is provided over the colored wooden overlay sheet 1. A primer layer comprising ionomer is then formed at an injection temperature of approximately 230° C., under a pressure of 40~150 MPa using a mold for injection-molding.

Polycarbonate resin (melting point: 250° C.) may be used to form a transparent resin layer instead of the ionomer, by means of a low-pressure compression injection-molding method at a injection temperature of 250°~260° C., under a pressure of 20~80 MPa.

EXAMPLE 8

A wooden material 1a in the upper portion of a wooden overlay sheet 1 is colored by using a colorant comprising a urethane resin. Subsequently, a primer layer is provided thereover. According to Example 8, the primer layer consists of two sub-layers of primers. A first primer sublayer comprising urethane resin is initially formed over the colorant. The first primer sub-layer is provided in order to prevent moisture and bubbles, which arise from the colorant provided thereunder, from penetrating a transparent resin layer which will be provided over the primer layer. A second primer sub-layer comprising acrylic resin is then formed. Each primer sub-layer is formed at room temperature by using a method such as an air spray method, an airless spray method, an air misting electrostatic method, a bell type electrostatic method, a flow coater method, a roll coater method, a roller curtain flow coater method, a spin coater method, and a dip coater method.

After the primer layer is provided, the wooden overlay sheet 1 is molded into a desirable shape, and a transparent resin layer is then injection-molded on the wooden overlay sheet 1 using the injection-molding device shown in FIG. 4. According to Example 8, the transparent resin layer is selected from one of the following resins:

(1) acrylonitrile styrene (AS) resin;
(2) acrylic resin;
(3) polymer alloy of acrylic resin and acrylonitrilebutadiene-styrene resin (AHS resin); and
(4) polymer alloy of acrylic resin and acrylonitrilestyrene resin.

The resin is injection-molded at approximately 240° C., under a pressure of 40~150 MPa during the molding.

Polycarbonate resin (melting point: 250° C.) may be used to form a transparent resin layer instead of resin selected from the above-mentioned resins (1)–(4), by means of a low pressure compression injection-molding method at a temperature of 250°~260° C., under a pressure of 20~80 MPa. A translucent polycarbonate layer may be employed as the transparent resin layer in order to reduce the internal stress generated in the transparent resin layer.

A composite molded article 4, which has been obtained in the aforementioned way, is a superb product with regard to its apparently realistic woody texture. Furthermore, on the front surface of the wooden overlay sheet 1, no pattern due to flow of the colorant was visible, and there was no separation of the wooden overlay sheet 1 and the transparent resin layer 3.

While the invention has been described with reference to preferred embodiments thereof, it will be understood by those skilled in the art that various changes in form and details may be made without departing from the teaching and scope of the invention.

TABLE I

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Colorant: | UC | UC | UC | UC | EC | UC | UC | UC |
| Primer resin: | | | | | | | | |
| (1) 1st sub-primer resin | U | U | U | U | E | UPE | U | U |
| (2) 2nd sub-primer resin | E, U | E | VB | VB | E | E | — | A |
| Transparent resin: | AS, A, A/ABS, A/AS PC | AS, A A/ABS, A/AS PC | AS A ABS | AS A ABS | AS, A A/ABS, A/AS PC | AS, A A/ABS, A/AS PC | I | AS, A A/ABS A/AS PC |

UC: urethane resin colorant
U: urethane resin
AS: acrylonitrile styrene resin
A: acrylic resin
A/ABS: polymer alloy of acrylic resin and acrylonitrile-butadiene-styrene resin
A/AS: polymer alloy of acrylic resin and acrylonitrile-styrene resin
PC: polycarbonate resin
VB: vinylbutyral resin
EC: epoxy resin colorant
E: epoxy resin
UPE: unsaturated polyester resin
I: ionomer resin

What is claimed is:

1. A production method for a composite article, comprising the steps of:
   (a) providing a wooden overlay sheet having a wood material on a first side thereof;
   (b) subjecting the first side of the wooden overlay sheet to color treatment with a colorant;
   (c) forming a resin-based primer on the colored wooden overlay sheet;
   (d) injection-molding a transparent resin layer directly on the resin-based primer.

2. A production method according to claim 1, wherein step (c) comprises the steps of:
   (c-1) forming a first resin-based primer layer on the colored wooden overlay sheet; and
   (c-2) forming a second resin-based primer layer on the first resin-based primer layer.

3. A production method according to claim 2, wherein step (c-1) comprises: selecting substance for the first resin-based primer layer from the group consisting of urethane resin, epoxy resin, unsaturated polyester resin and epoxy resin.

4. A production method according to claim 2, wherein step (c-2) comprises: selecting a substance for the second resin-based primer layer from the group consisting of epoxy resin, vinylbutyral resin, urethane resin.

5. A production method according to claim 1, wherein step (d) comprises the step of:
   (d-1) selecting a substance for the transparent resin layer from the group consisting of acrylonitrile styrene (AS) resin; acrylic resin; polymer alloy of acrylic resin and acrylonitrile-butadiene-styrene (ABS) resin; and polymer alloy of acrylic resin and acrylonitrilestyrene resin.

6. A production method according to claim 1, wherein the transparent resin is injected at a temperature about 240° C. and at a pressure within a range of 40–150 MPa.

7. A production method according to claim 1, wherein step (d) comprises the step of:
   (d-1) selecting polycarbonate resin as a substance for the transparent resin layer.

8. A production method according to claim 7, wherein the transparent resin is injected at a temperature within a range of 250°–260° C. and at a pressure within a range of 20–80 MPa.

9. A production method according to claim 1, wherein step (d) comprises the step of:
   (d-1) selecting ionomer as substance for the transparent resin layer.

10. A production method according to claim 9, wherein the ionomer is injected at a temperature at about 230° C. and at a pressure within a range of 40–150 MPa.

11. A production method according to claim 1, wherein the wooden overlay sheet has vessels and further comprising the step of:
    (a-1) filling the vessels in the wooden overlay sheet with resin based substance prior to step (b).

12. A production method according to claim 11, wherein in step (a-1) a urethane resin based colorant is used for filling the vessels.

13. A production method according to claim 12, further comprising the step of:
    (a-2) grinding a surface of the wooden overlay sheet prior to step (a-1).

14. A production method according to claim 1, wherein step (a) comprises providing a laminated structure of a wooden material layer, a metal layer, and rear portion layer.

15. A production method according to claim 1 further comprising the step of:

(e) forming a core layer on a second side of the wooden overlay sheet.

16. A production method according to claim 15, wherein step (e) comprises the step of:
(e-1) selecting a substance for the core layer from the group consisting of acrylonitrile styrene (AS) resin; acrylic resin; acrylonitrile-butadiene-styrene (ABS) resin; polymer alloy of acrylic resin and acrylonitrilebutadiene-styrene (ABS) resin; polymer alloy of acrylic resin and acrylonitrile-styrene resin; polymer alloy of AS resin and ABS resin; polycarbonate resin; polyphenylene oxide (PPO); and polystyrene.

17. A production method for a composite article, comprising the steps of:
(a) providing a wooden overlay sheet having a wood material on a first side thereof;
(b) subjecting the first side of the wooden overlay sheet to color treatment with a colorant;
(c) forming a first resin-based primer layer on the colored wooden overlay sheet;
(d) forming a second resin-based primer layer different from the first resin-based primer on the first resin based primer layer; and
(e) injection-molding a transparent resin layer directly on the second resin-based primer.

18. A production method according to claim 17, wherein step (c-1) comprises selecting a substance for the first resin-based primer layer from the group consisting of urethane resin, epoxy resin, unsaturated polyester resin and thermoplastic epoxy resin.

19. A production method according to claim 18, wherein step (c-2) comprises selecting a substance for the second resin-based primer layer from the group consisting of epoxy resin, vinylbutyral resin, and urethane resin.

20. A production method according to claim 12, wherein step (e) comprises the step of:
(e-1) selecting a substance for the transparent resin layer from a group consisting of acrylonitrile styrene (AS) resin; acrylic resin; polymer alloy of acrylic resin and acrylonitrile-butadiene-styrene (ABS) resin; and polymer alloy of acrylic resin and acrylonitrilestyrene resin.

21. A production method according to claim 20, wherein the transparent resin is injected at a temperature about 240° C. and at a pressure within a range of 40–150 MPa.

22. A production method according to claim 17, wherein step (e) comprises the step of:
(e-1) selecting polycarbonate resin as a substance for the transparent resin layer.

23. A production method according to claim 22, wherein the transparent resin is injected at a temperature within a range of 250°–260° C. and at a pressure within a range of 20–80 MPa.

24. A production method according to claim 17, the wooden overlay sheet has vessels and wherein step (d) comprises the step of:
(e-1) selecting ionomer as substance for the transparent resin layer.

25. A production method according to claim 24, wherein the ionomer is injected at a temperature at about 230° C. and at a pressure within a range of 40–150 MPa.

26. A production method according to claim 17, further comprising the step of:
(a-1) filling the vessels in the wooden overlay sheet with a resin based substance prior to step (b).

27. A production method according to claim 26, wherein in step (a-1), a urethane resin based colorant is used for filling the vessels.

28. A production method according to claim 27, further comprising the step of:
(a-2) grinding a surface of the wooden overlay sheet prior to step (a-1).

29. A production method according to claim 17, wherein step (a) comprises providing a laminated structure of a wooden material layer, a metal layer, and rear portion layer.

30. A production method according to claim 17 further comprising the step of:
(f) forming a core layer on a second side of the wooden overlay sheet.

31. A production method according to claim 17, wherein step (f) comprises the step of:
(f-1) selecting a substance for the core layer from the group consisting of acrylonitrile styrene (AS) resin; acrylic resin; acrylonitrile-butadiene-styrene (ABS) resin; polymer alloy of acrylic resin and acrylonitrilebutadiene-styrene (ABS) resin; polymer alloy of acrylic resin and acrylonitrile-styrene resin; polymer alloy of AS resin and ABS resin; polycarbonate resin; polyphenylene oxide (PPO); and polystyrene.

* * * * *